US010138130B2

(12) United States Patent
Madani et al.

(10) Patent No.: US 10,138,130 B2
(45) Date of Patent: *Nov. 27, 2018

(54) ULTRA DENSE AND ULTRA LOW POWER MICROHOTPLATES USING SILICA AEROGEL AND METHOD OF MAKING THE SAME

(71) Applicant: University of Louisiana at Lafayette, Lafayette, LA (US)

(72) Inventors: Mohammad Reza Madani, Lafayette, LA (US); Seyedmohammad Seyedjalaliaghdam, Lafayette, LA (US)

(73) Assignee: The University of Louisiana at Lafayette, Lafayette, LA (US)

( * ) Notice: Subject to any disclaimer, the term of this patent is extended or adjusted under 35 U.S.C. 154(b) by 607 days.

This patent is subject to a terminal disclaimer.

(21) Appl. No.: 14/711,164

(22) Filed: May 13, 2015

(65) Prior Publication Data

US 2016/0060127 A1    Mar. 3, 2016

Related U.S. Application Data

(63) Continuation-in-part of application No. 14/470,328, filed on Aug. 27, 2014, now Pat. No. 9,674,896.

(51) Int. Cl.
*C01B 33/14* (2006.01)
*H05B 3/10* (2006.01)
*H05B 3/22* (2006.01)

(52) U.S. Cl.
CPC ............. *C01B 33/14* (2013.01); *H05B 3/10* (2013.01); *H05B 3/22* (2013.01)

(58) Field of Classification Search
CPC ...................................................... C01B 33/14
See application file for complete search history.

(56) References Cited

U.S. PATENT DOCUMENTS

| | | | | |
|---|---|---|---|---|
| 3,988,824 A | * | 11/1976 | Bodway | H01L 21/707 205/125 |
| 5,689,151 A | * | 11/1997 | Wallace | H01J 7/18 313/481 |
| 9,674,896 B2 | * | 6/2017 | Madani | H05B 3/10 |
| 2012/0180563 A1 | * | 7/2012 | Wang | G01F 1/6845 73/204.26 |
| 2014/0323589 A1 | * | 10/2014 | Lazar | B01J 19/1862 514/770 |

(Continued)

OTHER PUBLICATIONS

Seyedjalali et al. Electronics Letters Aug. 29, 2013. vol. 49, No. 18. Two pages (unnumbered). Obtained from http://digital-library.theiet.org/docserver/fulltext/el/49/18/EL.2013.1389.pdf?expires=1505918426&id=id&accname=119445&checksum=5C4C3CAC6FBEDC197F316DF6215B0760 on Sep. 20, 2017.*

*Primary Examiner* — Michael A Salvitti

(74) *Attorney, Agent, or Firm* — Russel O. Primeaux; Robert Devin Ricci; Kean Miller LLP

(57) ABSTRACT

An ultra dense and ultra low power microhotplates using silica aerogel and method of making the same, comprising creating a sol-gel by impregnation of ethanol with functional colloidal alcogel particles is described. The technique further comprises forming tiny aerogel particles on the wafer and networking the particles together just by exposure to air during spin coating. The novelty of this technique is not limited to the processing of thin film and thick film silica aerogel.

4 Claims, 11 Drawing Sheets

(56) References Cited

U.S. PATENT DOCUMENTS

2015/0201463 A1* 7/2015 Madani .................... H05B 3/10
                                                    204/192.15
2016/0060127 A1* 3/2016 Madani ................... C01B 33/14
                                                    427/560

* cited by examiner

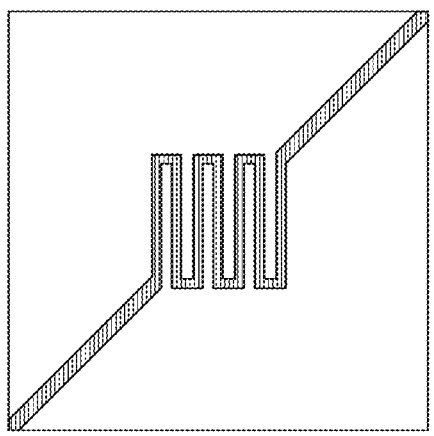
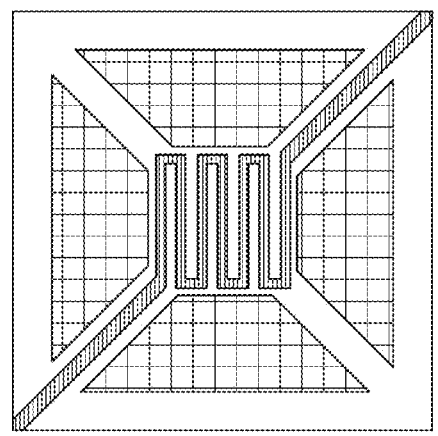
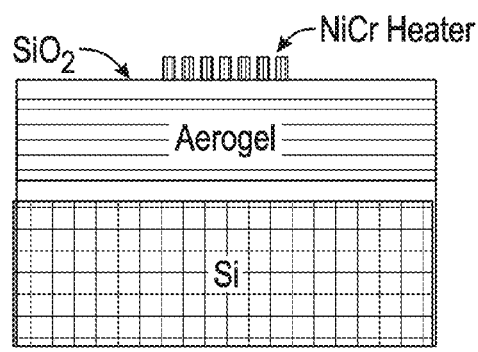
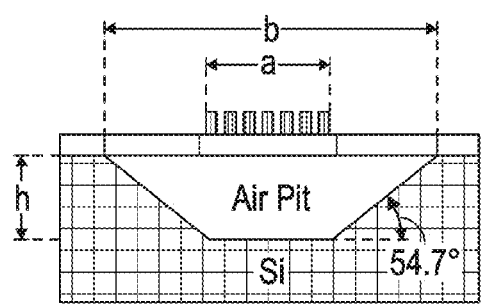
FIG. 1A
FIG. 1B
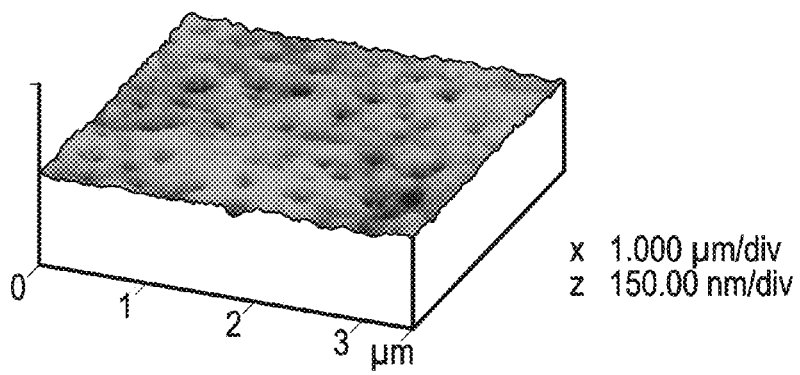
FIG. 2

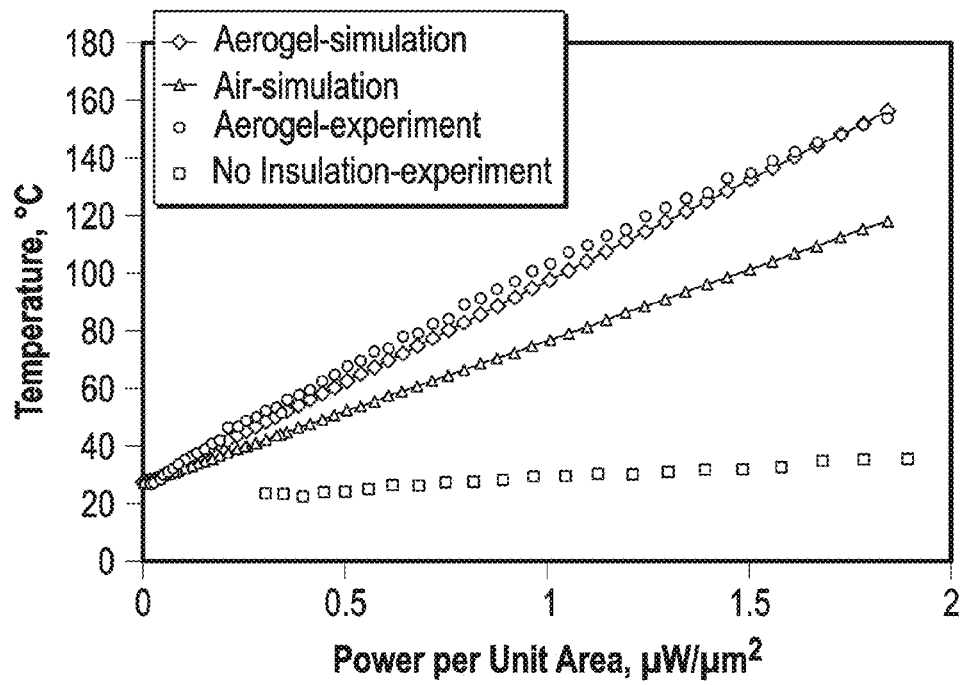
FIG. 3
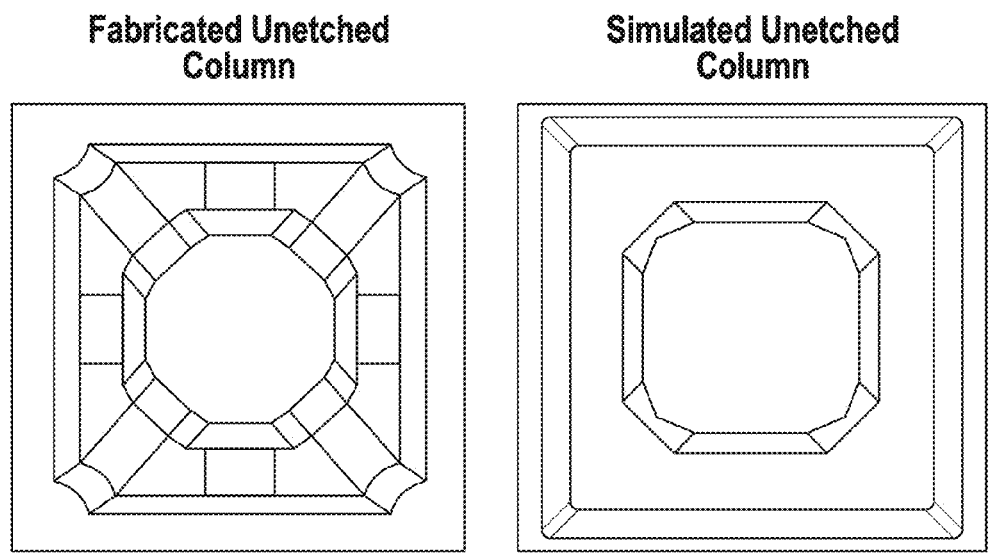
FIG. 4A
FIG. 4B

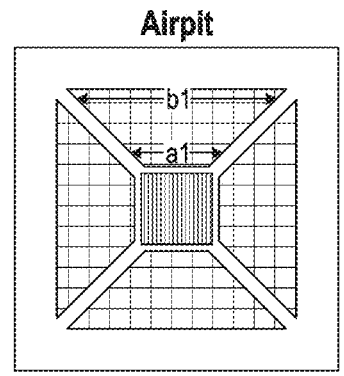
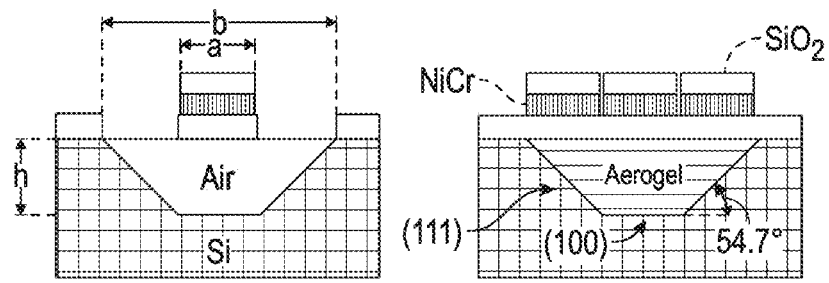
FIG. 9A  FIG. 9B
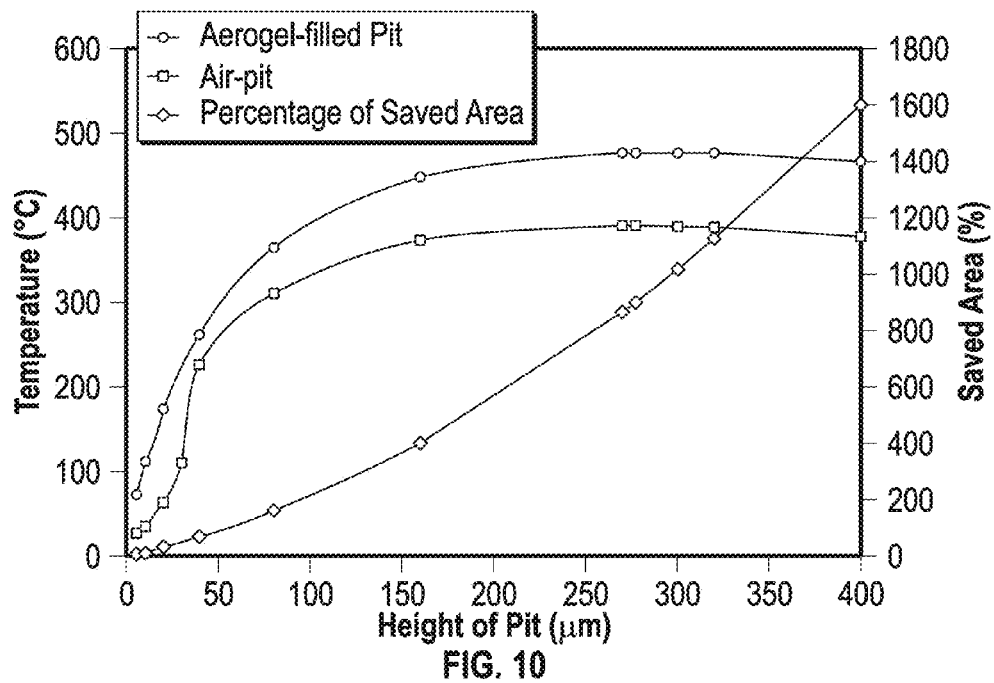
FIG. 10

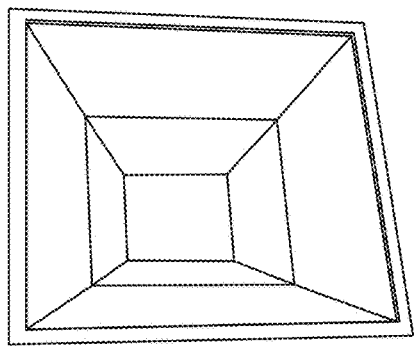
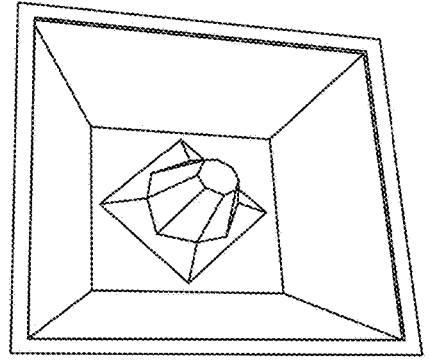
FIG. 11A          FIG. 11B
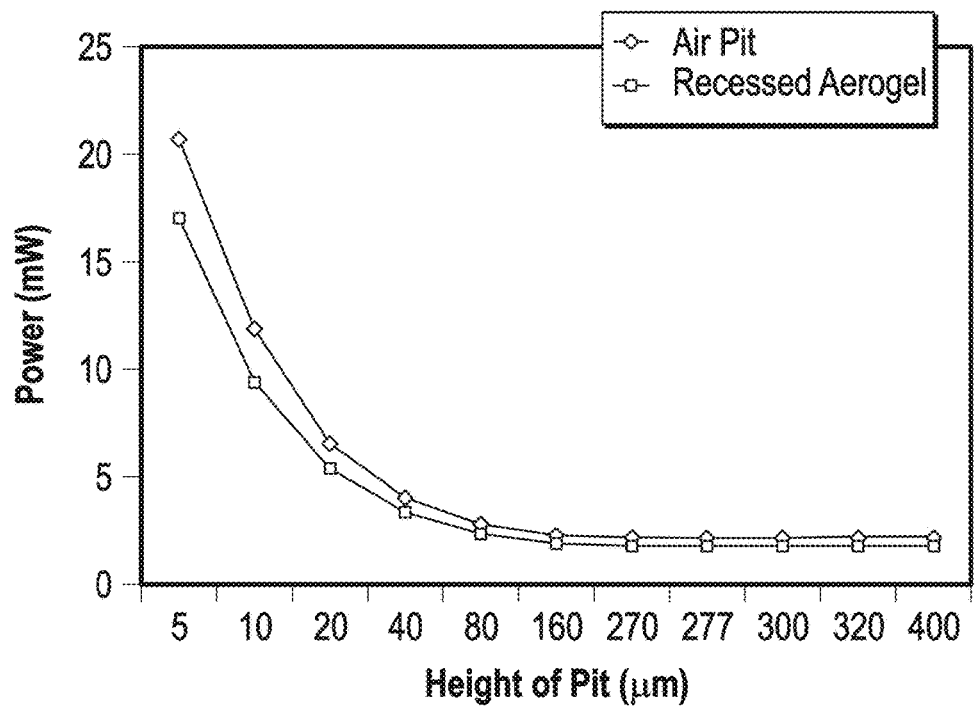
FIG. 12

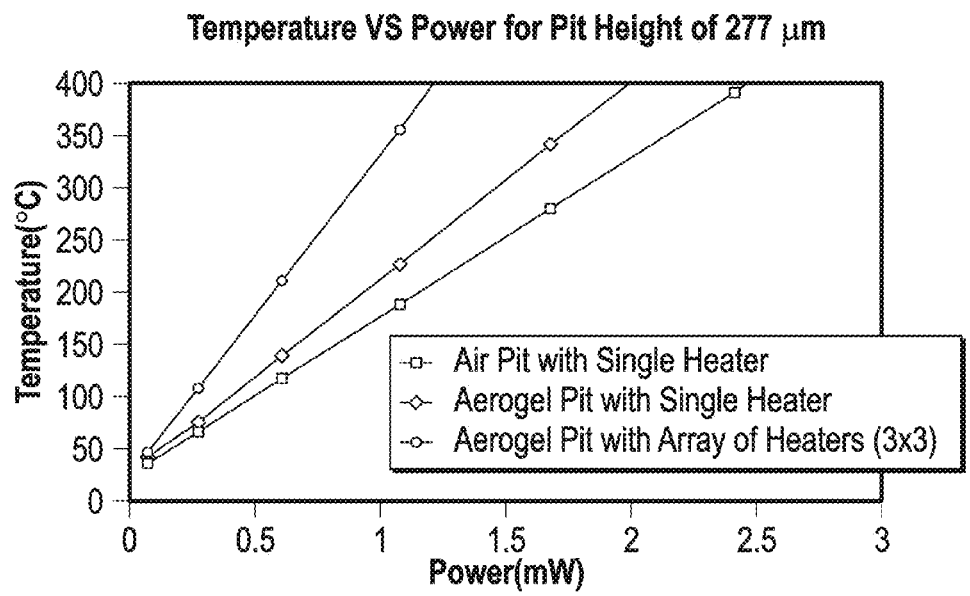
FIG. 13
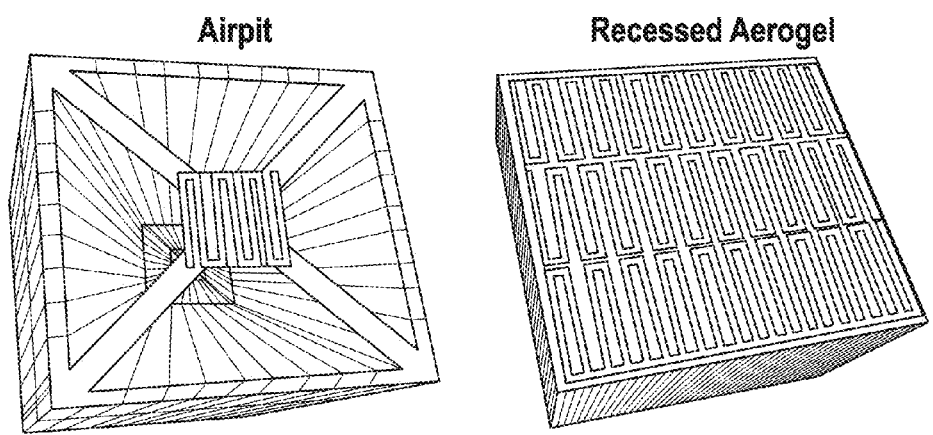
FIG. 14A
FIG. 14B (a) 0.385/7.005=0.055
µmole acid/µmole base (b) 1.925/56.04=0.034
µmole acid/µmole base (c) 1.925/112.08=0.017
µmole acid/µmole base (d) 3.85/84.06=0.046
µmole acid/µmole base (e) 5.775/98.07=0.059
µmole acid/µmole base (f) 7.7/42.03=0.183
µmole acid/µmole base Temperature vs. Power
4.5 μm thick aerogel

ULTRA DENSE AND ULTRA LOW POWER MICROHOTPLATES USING SILICA AEROGEL AND METHOD OF MAKING THE SAME

CROSS REFERENCE TO RELATED APPLICATIONS

This application claims priority to the non-provisional U.S. patent application Ser. No. 14/470,328 entitled "ULTRA DENSE AND ULTRA LOW POWER MICROHOTPLATES USING SILICA AEROGEL AND METHOD OF MAKING THE SAME" filed Aug. 27, 2014, which claims priority to the provisional U.S. patent application No. 61/871,205 entitled "ULTRA DENSE AND ULTRA LOW POWER MICROHOTPLATES USING SILICA AEROGEL" filed Aug. 28, 2013.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the ultra dense and ultra low power microhotplates using silica aerogel and the method of making the ultra dense and ultra low power microhotplates using silica aerogel, which may be embodied in various forms. It is to be understood that in some instances, various aspects of the invention may be shown exaggerated or enlarged to facilitate an understanding of the invention. Therefore the drawings may not be to scale.

FIG. 1 depicts a schematic structure of heaters for experiment and simulation. FIG. 1A depicts a NiCr heater built on an aerogel. FIG. 1B depicts a heater built on an air pit.

FIG. 2 is an atomic force microscope (AFM) image of the processed porous thin film aerogel.

FIG. 3 is a graph depicting the obtained temperature versus power per unit area for 0.8 µm thick aerogel insulation, 0.8 µm deep air insulation, and no insulation.

FIG. 4 depicts a trapezoid opening limitation on perfect etching. FIG. 4A depicts a fabricated unetched column. FIG. 1B depicts a simulated unetched column.

FIG. 9A depicts a schematic of a single microhotplate on an air pit. FIG. 9B depicts a schematic of an array of microhotplates on recessed aerogel.

FIG. 10 is a graph depicting the temperature and saved area for different heights of pits.

FIG. 11A depicts a 3-dimensional image of an air pit simulated by IntelliEtch a module of IntelliSuite. FIG. 11B depicts a 3-dimensional image of a remaining unetched column for an air pit simulated by IntelliEtch a module of IntelliSuite.

FIG. 12 is a graph depicting the power consumption needed to maintain 360° Celsius when using an air pit or a recessed aerogel.

FIG. 13 is a graph depicting temperature versus power for a pit height of 277 µm.

FIG. 14A depicts a 3-dimensional view of an air pit with a single heater. FIG. 14B depicts a 3-dimensional view of a recessed aerogel with an array of heaters (3×3).

DETAILED DESCRIPTION

Figure 5A:
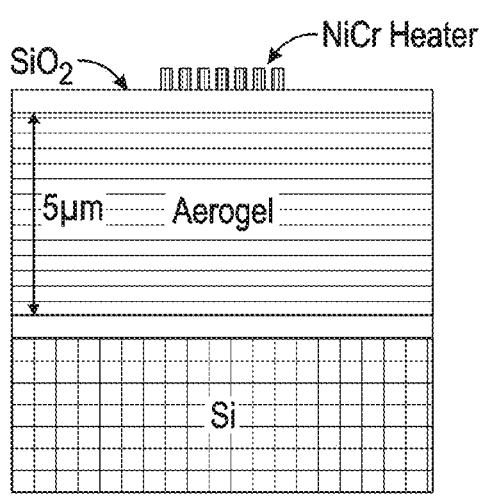
FIG. 5A is a schematic depicting a single thick layer aerogel.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. One skilled in the relevant art will recognize, however, that the ultra dense and ultra low power microhotplates using silica aerogel and the method of making the same may be practiced without one or more of the specific details, or with other methods, components, materials, and so forth. In other instances, well-known structures, materials, or operations are not shown or described in detail to avoid obscuring aspects of the invention. Additionally, the order in which a particular method occurs may or may not strictly adhere to the order of the corresponding steps shown.

Furthermore, constants, variables, dimensions, and measurement values are within "engineering approximation" and reasonable variation amongst them does not limit the scope of the patent.

Metal oxide (also referred to herein as, "MOX") sensors have significant domestic and industrial applications in gas detecting instruments. The main component of the MOX gas sensors is a plate called a microhotplate (also referred to herein as "µHP") on which the gas sensing elements are fabricated. The temperature of the sensing elements must be maintained in the range of approximately 300° Celsius to 500° Celsius for efficient gas detection. This demands a highly efficient heater with minimum power consumption, maximum density, and fast response time when utilized in a sensor array. The current approach to achieve the desired temperature is to micromachine the semiconductor substrate to have an air pit acting as a thermal insulator. However, a large area is sacrificed to micromachine the air pit leading to a low density sensor array. It also results in low reliability in gas detection because there are a fewer available number of sensors in a given area. The other issue is to minimize the power consumption which is mainly consumed by the µHPs. Previous studies have reported power consumption per unit area of approximately 0.12 to 10 µw/µm$^2$ to maintain the temperature in the range of approximately 300° Celsius to 400° Celsius.

Aerogels are synthetic materials that are highly versatile and have unique properties. For instance, aerogels are the lightest solids in existence and have density values as low as approximately 0.003 g/cm$^3$ compared to the air density of 0.0012 g/cm$^3$, which is the density of air at sea level and 15° Celsius. Aerogel is basically a highly porous gel filled mostly with air, which is sometimes called "frozen smoke." Aerogel is produced by the so-called "sol-gel process" in which organic compounds containing a metal undergo a chemical reaction thus producing a metal oxide. The solution is liquid at first and, as the reaction proceeds, a network is then created with metal and oxygen bonds, making it more viscous until it becomes a three-dimensional network gel filled with the solvent. After a drying stage (commonly supercritical drying), the solvent is extracted from the gel to make a porous network largely filled with air (usually more than 90% air), creating the "aerogel." The created aerogel generally has the following properties: low thermal conductivity (approximately 13 mW/mK), large surface area (500-1000 m$^2$/g), and small pore size (5 to 100 nm). Aerogels can be produced from metals, compounds containing both inorganic and organic sources, and whole organic precursors. Metals that can be used to create aerogels include, but are not limited to: silicon, carbon, titanium, aluminum, zinc, etc. Due to its thermal stability and tunability of porosity, silica is the metal that is sometimes used in the making of aerogel. Aerogels have countless potential applications in various industries, including, but not limited to: insulation, such as heat insulating textile and heat and sound insulation coatings; nano-composites; adsorbents; optical devices, waveguides and fiber optics; inter-metal dielectrics; integrated circuit manufacturing and integrated circuit heat management; drug delivery systems; gas sensors, solar cells, fuel cells, and gas storage; and Cherenkov detectors. The industries that can benefit from aerogels include, but are not limited to: the gas sensors, energy, and power industries; the communication industry; the integrated circuit chips and MEMS industry; the oil and gas industry; the construction materials industry; the pharmaceutical and biological industries; and the textile industry.

Even though some of the applications from bulk processing of aerogel are being utilized by industry, the attempts of fabricating aerogel as thin films or thick films are hampered due to low porosity, cracking, and roughness of the aerogel. Therefore the research in the area of aerogels has been limited only to academic publications. Currently, the processing of thin film or thick film aerogel is considered to be too complex and challenging. The complexity of producing thin film aerogels stems from the induced high capillary stress and shrinkage during drying. Supercritical drying and/or solvent extraction yield thick film aerogels that are no more than a couple of microns thick. To date, there has been no resolution to the problems associated with thick film (approximately 4 to approximately 50 µm) aerogel processing nor any reports regarding the roughness of the thick film aerogels. The roughness of the aerogel film is very important for microsensor fabrication where planar technology is required for producing minimum feature size microstructure on the film. Thin aerogels films are typically less than approximately 4 µm, while thick aerogel films are typically approximately 4 µm to 50 µm.

Silica aerogel has gained attention both in research and industrial communities due to its unique properties, such as ultra-low thermal conductivity, high thermal stability, and high specific surface area. Recently there have been several studies on aerogel applications in the various fields including but not limited to capacitive deionization of water aero capacitor due to the high surface area of aerogel, and sound absorption in ultrasonic devices. More recently, aerogels have been successfully synthesized in different forms of microspheres, thin films, and flexible sheets. Thin films have received more interest in applications such as ideal dielectrics for ultrafast integrated circuits and heat insulator in gaseous sensors due to the low thermal conductivity of aerogel. Combining thin film areogels with microelectromechanical systems (also referred to herein as "MEMS") expands the potential applications of aerogel in devices requiring a steady high temperature.

The MOX gas sensors should operate at temperature range of 300° Celsius to 500° Celsius for maximum sensitivity. The sensing material is deposited on a plate called microhotplate. The high operating temperature of MOX gas sensor demands an efficient design to consume low power in order to raise the temperature of the µHP to desired level as quickly as possible. Various designs and materials have been considered for microhotplate fabrication. Specifically, a microhotplate fabricated with an active surface area of 50×60 µm$^2$ was reported to consume 30 mW power when operating at 350° Celsius. In another article, a circular active surface area of 80 µm in diameter was developed to operate at higher temperature of 400° Celsius consuming 8.9 mW only. The latter achieves significant improvement in power efficiency by increasing its pit height to 400 µm based on front side bulk micromachining. However, this power efficiency is at a significant expense of chip area taken by each sensor. By simple calculation one can quickly realize that the minimum chip area needed to micromachine such a deep pit would be in order of 566×566 µm$^2$, which is approximately 64 times the size of microhotplate itself. As a result, microsensor arrays obtained using such microhotplate design will undoubtedly suffer from a very low sensor density. Briand et al. reported making a microhotplate gas sensor on a polyimide layer (as an etch stop layer) using tedious back side micromachining. However, they ended up with an effective heated hotplate size of 750×750 μm² and power consumption of 66 mW to reach the temperature of 325° Celsius while using large area (1.5×1.5 mm²) for backside micromachining. Therefore, there is an urgent need of area efficient gaseous sensor design with low power consumption to present a cost-effective manufacturing of sensor arrays on the wafer.

To overcome the limitation of low density sensor arrays and high power consumption to reach high temperatures on microhotplates, we developed a novel approach of using aerogel as heat insulator rather than using air. The conventional method to insulate the microhotplate from the silicon substrate is to micromachine the silicon (Si) substrate to form an air pit. Wet micromachining is a post processing step, where over etching may occur while masking the sensor and its circuitry due to improper etching time control or pinholes in the masking material. This can reduce the yield and compromise the mechanical stability of the microhotplate. During the fabrication process of the μHP, Laconte et al. reported broken membranes due to backside micromachining with Tetra Methyl Ammonium Hydroxide (TMAH) etchant, which also damaged aluminum interconnections when the masking layers failed. Furthermore, many of the surviving membranes were broken during subsequent deposition of the sensing layer material, photolithography processes, and selective wet etching. Dicing is another cause of the yield loss, since conventional dicing utilizes high water pressure to remove debris from the chip surface.

Using relatively thick (40 to 100 μm) aerogel material, instead of air, as the heat insulator yields the following advantages: (1) ultra-low power consumption, (2) area-efficient design, which results in high sensor density, (3) excellent temperature uniformity across the microhotplate surface, (4) low manufacturing costs (due to high yields), (5) high mechanical stability, and (6) fast fabrication. However, processing a thick layer of aerogel of 5 μm or more is extremely difficult using multilayer processing since the spin coating of aerogel is limited to 0.6 μm to 1.2 μm per layer. In view of the fact that a relatively thick layer of aerogel is required for ultra-low power MOX sensors, the step coverage problem for the metal interconnection lines between the sensor array and the CMOS chip circuitry will pose significant yield problem. However, as described herein, the recessing of the thick layer of aerogel in a selected area of the chip not only resolves the step coverage problem but also avoids tedious and difficult multilayer processing of thick aerogel film. Furthermore, the recessed aerogel processing will not adversely lower the yield caused by post-processing of the sensor array.

Using aerogel as a heat insulator yields the following advantages over the micromachined air pit conventionally used as a heat insulator in metal oxide gas sensors: 1) superior heat insulation capability, hence lower consumed power, 2) more mechanical stability of the sensor by not suspending the sensor structure by four thin straps, and 3) a denser sensor array by avoiding micromachining.

Herein described is a novel technique for performing the sol-gel processing that overcomes these limitations of thin film and thick film manufacturing. The technique described herein avoids steps including solvent exchange and/or supercritical drying. The technique comprises impregnation of ethanol with functional colloidal alcogel particles, which is a distinctive and different approach from the currently used conventional methods. The technique comprises forming tiny aerogel particles on the wafer and networking the particles together just by exposure to air during spin coating. The novelty of this technique is not limited to the processing of thin film and thick film silica aerogel. This technique can be applied to many other sol-gel processes and many other coating applications, including but not limited to: insulation, such as heat insulating textile and heat and sound insulation coatings; nano-composites; adsorbents; optical devices, waveguides and fiber optics; inter-metal dielectrics; integrated circuit manufacturing and integrated circuit heat management; drug delivery systems; gas sensors, solar cells, fuel cells, and gas storage; and Cherenkov detectors.

In the operation of the conventional air pitted gaseous sensors, the microhotplate consumes almost all the power used by the sensor. The required area to micromachine the air pit for the microhotplate of a single sensor is several times more than the actual area required for the sensor itself. In comparison with the conventional air pitted microhotplate structure, the recessed aerogel microhotplate disclosed herein not only has decreased the utilized area of the chip almost tenfold (181×181 μm² vs. 573×573 μm²) to maintain a temperature of 360° Celsius, but also has decreased the power consumed by each microhotplate more than two fold (1 mW vs. 2.1 mW). As the number of sensors increases in a sensor array, the saved area of the chip increases quadratic by using the structure disclosed herein. Moreover, the power consumed by the new designed structure reduces drastically.

An Example of Single Thin Layer Aerogels by Supercritical Method.

Thin film aerogels from approximately 0.5 μm to approximately 0.8 μm in thickness are prepared using the following procedure; first a solution was prepared implementing a 2-step sol-gel method by mixing TEOS (Si precursor), ethanol (solvent), water, and HCl (acid catalyst) with the molar ratio of $1:4:4.2:4\times10^{-4}$, respectively. After an hour of stirring the solution, 0.64 ml of $NH_4OH$ 0.06 M (base catalyst) was added and stirred for 5 more minutes. The sol-gel was deposited on the wafer after 60% of gelation time (20 minutes), followed by spin coating at 2000 RPM for 15 seconds. Next, an ethanol exchange was carried out for a period of 24 hours to strengthen the gel network. Finally, the aerogel thin film of approximately 0.8 μm thickness was obtained by supercritical drying the wafer with $CO_2$ followed by annealing at 450° Celsius for an hour.

In one embodiment, thin film Nichrome heaters with good adhesion to aerogel were created by sputtering an interlayer of $SiO_2$ before sputtering NiCr ($Ni_{80}/Cr_{20}$) on the wafer. For CMOS compatibility polycrystalline silicon can be used as heater element. Later, a photolithography procedure was carried out to obtain the desired heater structure shown in FIG. 1a.

The schematic structure used in our experiment and simulations are shown in FIG. 1a. The simulated air pit structure created by the conventional micromachining is shown in FIG. 1b. The atomic force microscope (AFM) image shown in FIG. 2 demonstrates the surface topology of the thin film aerogel. The porous structure can be clearly observed in the image. The root mean square roughness on the surface is as low as 1.33 nm which represents the smooth surface of the aerogel thin film. The extremely low roughness of the thin film enables high quality photolithography and masking. The refractive index and the thickness of the thin film were studied by using a Spectroscopic Reflectometer (SR300) which measured the reflecting light signal from the sample. The refractive index was measured as 1.053 at wavelength 633 nm (FIG. 6), corresponding to the porosity ($\pi$) of 85% using $\pi=1-((n_f-1)/0.209\rho_s)$, where $n_f$ is the refractive index of the aerogel thin film and $\rho_s$ is the density of thermal oxide $SiO_2$ (2.19 g/cm³). Finally, the thickness of the thin film was determined as 807 nm.

To verify the experimental results a thermo-electrical analysis of our designed structures was performed by utilizing a MEMS simulation software, IntelliSuite. The software is equipped with the following modules: IntelliMask to design the mask; 3D Builder to create the meshed solid blocks and differentiate their entities on different layers; TEM (ThermoElectroMechanical) to assign the properties of each entity, load the initial conditions, and simulate the temperature gain by applying voltage to one end of the heater while keeping the other end at zero potential.

The temperature of the heater was measured as a function of the applied electrical power by measuring the change in heater resistance based on the following equation: $\Delta R/R_0 = \alpha \Delta T$, where $\alpha$ is the temperature coefficient of resistivity and $R_0$ is the initial resistance of the heater at reference temperature (27° Celsius). There are three major observations with regard to the obtained temperature at different applied powers per unit area, noted in FIG. 3. First is the comparison of the experimentally measured temperature of heaters processed on aerogel and heaters processed on silicon wafer without heat insulation (no aerogel or air insulation). The excellent ability of aerogel to insulate heat is pronouncedly seen where a good increase of temperature is detected in the case of aerogel coated wafers (0.8 μm thick aerogel) while almost no change in temperature is observed for the wafers without the aerogel, indicating the presence of a heat sink in the form of silicon substrate under the heater.

Second, the comparison between the simulation results of aerogel coated wafers and wafers with a micromachined air pit with the same aerogel thickness and air pit depth was performed. Yet again, a better thermal insulation is observed for the aerogel insulation as compared to air insulation due to the ultra-low thermal conductivity of aerogel. Although we simulated an air pit of 0.8 μm depth, it is not possible to micromachine such a shallow air pit using the usual trapezoidal shaped mask. In fact, to etch out the silicon from underneath of an a×a hotplate h deep, the required square size opening is: $b = a + (2 h/(\tan(54.7°)))$. The etchant will etch the silicon through the opening area of the trapezoid to make the air pit as shown in FIG. 1b. However, in order to build the air pit we are limited by the trapezoid openings in micromachining. For instance, up to a certain height h, a column of silicon will remain unetched as demonstrated both by experiment and simulation in FIGS. 4a and 4b. The unetched silicon column will act as a heat sink between the microhotplate and the substrate, preventing the temperature to reach the desired value. In addition, we previously demonstrated by simulation that for the applied power per unit area of 0.07 μW/μm² an air pit of 160 μm depth is needed to obtain 360° Celsius compared to an 80 μm thick layer of aerogel to obtain the same results.

Moreover, according to the equation $b = a + (2 h/(\tan))$ (54.7°), the area of the mask opening or the total occupied area to suspend a single hotplate increases as a square function of the height of the pit. Hence, one can calculate the percentage of saved area as: $S = ((b^2 - a^2)/a^2) \times 100$, which implies that the micromachined air pit for each individual sensor in a sensor array uses much more area of the chip than using aerogel on the wafer for the same array. Hence, a denser sensor array can be fabricated quite easily by using aerogel as compared to a micromachined air pit.

The last and most significant observation from FIG. 3 is the close match between experimental and simulation results for aerogel coated wafers considering the temperature versus applied power per unit area. For instance, for the applied power per unit area of 1.6 μW/μm² the measured temperature is 140° C. compared to the simulated temperature of 133° C.

Air Pit Design and Chip Area Considerations.

The whole structure of the conventional air pit is made of 3 layers as depicted in FIG. 9(a). At the bottom there is a p-type silicon substrate in which an air pit is created to provide thermal insulation. The first layer is a dense 2 μm thick thermally grown $SiO_2$ or $Si_3N_4$ serving as micromachining mask shaped into four suspended bridges for mechanical support of the sensor shown in FIG. 9(a). But in the case of aerogel, this layer is a complete layer of $SiO_2$ on top of the aerogel and the thickness can be as low as 0.2 μm, as illustrated in FIG. 9(a). The second layer is the NiCr ($Ni_{80}/Cr_{20}$) on top of $SiO_2$ which is also 0.2 μm. This layer can be highly doped polysilicon for CMOS process compatibility. Finally, the third layer is an $SiO_2$ layer, of 0.6 μm thickness, to provide electrical insulation of heater from the sensing layer. This third $SiO_2$ layer also yields better temperature uniformity across the microhotplate since $SiO_2$ is relatively a good heat conductive material. For even better heat uniformity a layer of $Si_3N_4$ would be deposited on the $SiO_2$ layer or replaced $SiO_2$. For the non-recessed spin coated thin aerogel, micromachining of the silicon is completely eliminated. Although the thicker aerogel reduces the power drastically, high step coverage for very thick aerogel plateau decreases the yield severely unless through-aerogel via (TAV) is used to connect the MOX sensor to the CMOS circuitry. We investigated the recessed aerogel with micromachining a large area of silicon for sensor arrays prior to the fabrication of the sensor. Then we filled the anisotropically etched cavity with aerogel.

Anisotropic etching is used to form the cavity underneath the microhotplate of the gas sensor. The etching is called anisotropic since the etching rate is high in the (100) direction and low in the (111) direction as shown in FIG. 9(b). The etch rate in the two directions can be as different as 300 to 1. In the silicon crystal lattice structure, the (111) planes are oriented at 54.7° relative to the (100) plane (FIG. 9(b)). A square mask opening on the surface of the wafer will yield an etched feature in the shape of inverted pyramid at the depth determined by the intersection of (111) plane. To suspend the microhotplate in the air, a mask is made with four trapezoids (with dimensions of: $a_1$=short base, $b_1$=long base, and $h_T$=altitude) placed close together from their short bases $a_1$ to form an area of square of a×a where $a = a_1 + 2\Delta w$ for the microhotplate (FIG. 9(a)). The area considered for the hotplate is 181×181 μm² (a=181). The four long bases of the trapezoids $b_1$ will form the mask opening area of b×b where $b = b_1 + 2\Delta w$. The four straps, which hold the microhotplate suspended in the air after micromachining, each have the width $w = \sqrt{2}\Delta w$ and the length of each strap is $l = \sqrt{2}(b-a)/2$ The thermo-electrical analysis of the disclosed structures was performed by utilizing a MEMS simulation software, IntelliSuite. The software is equipped with the following modules: IntelliMask to design the mask; 3D Builder to create the meshed solid blocks and differentiate their entities on different layers; TEM (ThermoElectroMechanical) to assign the properties of each entity, load the initial conditions, and simulate the temperature gain by applying voltage to one end of the heater, keeping the other end at zero potential; the IntelliEtch will figure out the final shape of micromachined structure by using an etchant like KOH buffer. The temperature at the bottom of the silicon substrate is set to room temperature of 27° Celsius to resemble the reference temperature. Input power can then be calculated by knowing the applied voltage and reading the current density passed through the heater.

To etch out the silicon from underneath of an a×a hotplate h deep, the required square size opening is: b=a+(2 h/tan (54.7°))).

The etchant will etch the silicon through the opening area of the trapezoid to make the air pit as shown in FIG. 9(*a*). On the other hand, in order to make the pit filled with aerogel there is no need of a trapezoid mask, but a simple square mask would create the pit as illustrated in FIG. 9(*b*). According to the equation: b=a+(2 h/tan(54.7°))), the area of the mask opening or the total area used increases as a square function of the height of the pit. Hence, one can calculate the percentage of saved area as: $((b^2-a^2)/a^2) \times 100$, which implies that the micromachined air pit for each individual sensor in a sensor array uses much more area of the chip than using aerogel on the wafer for the same array. FIG. 10 demonstrates the percentage of the saved area for different depths of the micromachined pit. For instance, by having a depth of only 160 μm pit filled with aerogel, we can significantly save four times less area than that of our air pit. In another word, for every sensor processed with an air pit we can have 5 sensors using aerogel. As the height of the aerogel increases, more space would be saved by a parabolic factor. Hence, a denser sensor array can be fabricated quite easily by using aerogel compared to a micromachined air pit.

In order to build the conventional air pit, we are limited by the trapezoid openings in micromachining. For instance, up to a certain height h, a column of silicon will remain unetched as demonstrated in FIG. 11*b*. The unetched silicon column will act as a heat sink between the μHP and the substrate preventing the temperature to reach to the desired value as shown in FIG. 10 for the air pit of height less than approximately 50 μm. However, for the recessed aerogel any desirable size of the pit height is achievable with a simple Manhattan mas opening. Once the pit is filled with aerogel, an array of μHPs is processed on top of the recessed aerogel.

As shown in FIG. 12, to maintain 360° Celsius the power consumption by μHP array reduces exponentially as the height of the recessed aerogel increases. For heights equal and greater than 160 μm, the power consumed by the sensor array will reach to a minimum value of approximately 2.0 mW.

In FIG. 13 temperature versus the consumed power per μHP is plotted for an air pitted, recessed aerogel, and 3×3 array (573×573 μm$^2$) of μHP on recessed aerogel. The height of the pit is 277 μm. The power consumed by a μHP of an array made on the recessed aerogel gave the best result. In FIG. 10 for applied power of approximately 2.4 mW per heater, the superior heat insulation of recessed aerogel is observed. However, for the air pitted μHP that the height is not sufficient to have a large b for a given a according to the equation b=a+(2 h/(tan(54.7°))), the temperature would stay low because of the heat sink path through the unetched column. The two structures depicted in FIG. 14 demonstrate the air pit with single heater (FIG. 14(*a*)) and recessed aerogel with array of heaters (FIG. 14(*b*)).

The recessed aerogel not only improves the efficiency of the microhotplate, but also eliminates the problem of step coverage that can severely reduce the yield of IC-microsensors array chips in manufacturing. The recessed aerogel also has the advantage of micromachining the desired cavity of any size and height prior to fabrication of the sensor arrays. In addition to the aforementioned advantages of the new structure, the recessed aerogel is shown to have extremely low power consumption, as low as 3 μW/μm$^2$ for the microhotplate to maintain the temperature at 360° C. and it can also save the area as much as ten times (2.95×10$^5$ μm$^2$) compared to conventional microhotplate structures.

Multilayer Aerogels.

Figure 5B:
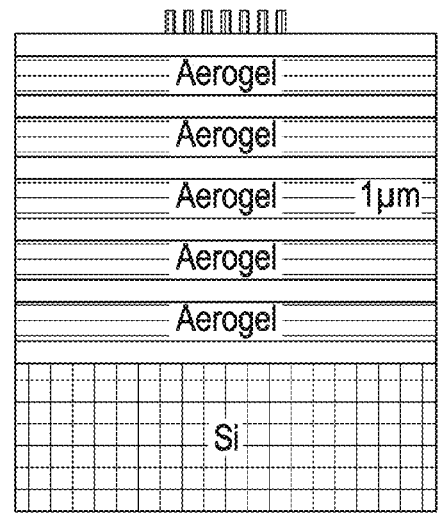
FIG. 5B depicts a proposed multilayer aerogel interleaved with capping layers such as sputtered $SiO_2$.

Sputtered SiO$_2$ can be used as an interlayer to create both thick and thin film aerogels. In one embodiment, an interlayer thin film SiO$_2$ (approximately 200 nm) was sputtered on the aerogel layer, before processing the next aerogel layer. The sputtered SiO$_2$ covers the porous surface of the aerogel thin film, enabling multilayer thick aerogel processing as shown schematically in FIG. 5(*b*). The individual thin film aerogel layer thickness obtained was approximately 0.5 μm to approximately 0.8 μm for each spin coating which was not sufficient to provide required thermal insulation to achieve high temperature which low power consumption as reported in our previous work. To increase the thickness of the aerogel film another layer was spin-coated on the first layer. However, due to the porous nature of the first aerogel thin film, the second layer penetrated down while spin-coating, resulting in non-uniform surface. Moreover, the penetrated solution fills the pores of the first layer, making it a non-porous dense film. Simulation results indicate sputtering SiO$_2$ between the aerogel layers in formation of multiple layers of aerogel yielded similar thermal performance as the thick multilayer aerogel without using SiO$_2$.

Figure 6:
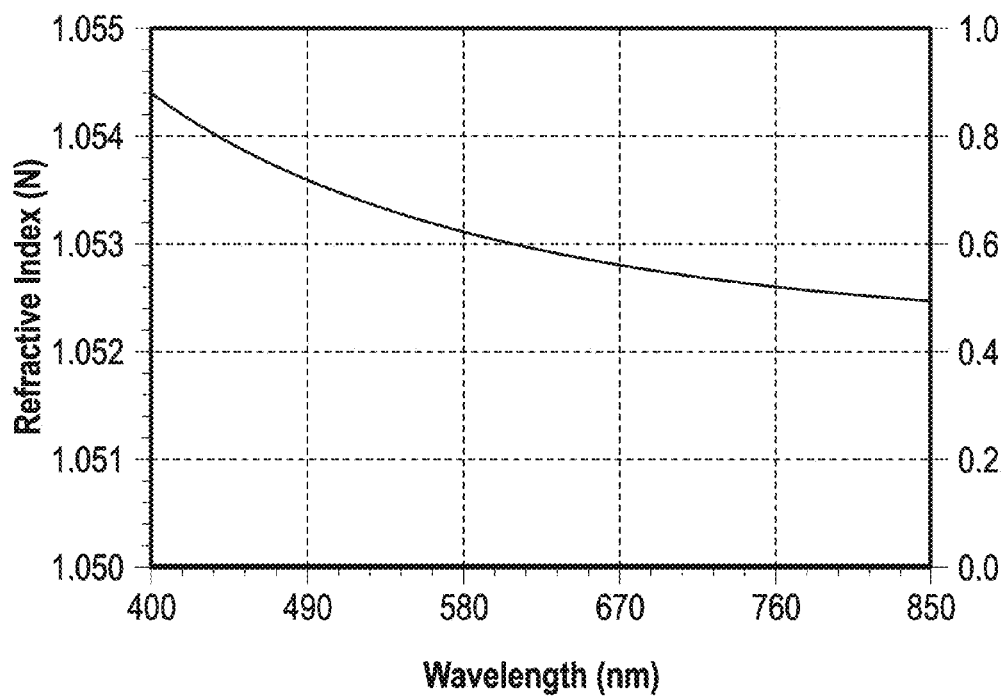
FIG. 6 is a graph depicting the refractive index of the thin film aerogel measured by spectroscopic reflectometer at different wavelengths.

The obtained thin film aerogel was characterized with atomic force microscope (AFM) and spectroscopic reflectometer (SR300) to study the surface topology and measure the thickness of the thin film, respectively. The thickness of each thin film aerogel layer was measured as approximately 800 nm. The refractive index was also determined by spectroscopic reflectometer (SR300) as low as 1.053 at wavelength 633 nm as shown in FIG. 6. The porosity ($\pi$) of a thin film is related to its refractive index according to the following equation: $\pi=1-((n_f-1)/0.209\rho_s)$, where $n_f$ is the refractive index of the aerogel thin film and $\rho_s$ is the density of thermal oxide SiO$_2$ (2.19 g/cm$^3$). The corresponding porosity was determined as approximately 85%. This high porosity ensures excellent thermal insulation.

The performance of the multilayer aerogel (five layers of 1 μm each, interleaved with sputtered SiO$_2$) and the thick single layer aerogel (5 μm) was investigated by simulation using the thermo-electrical module of IntelliSuite software. The software is equipped with different modules of: IntelliMask to design the mask; 3D Builder to create the meshed solid blocks and differentiate their entities on different layers; TEM (Thermo Electro Mechanical) to assign the properties of each entity, load the initial conditions, and simulate the temperature gain by applying voltage to one end of the heater, keeping the other end at zero potential. The temperature at the bottom of the silicon substrate is set to room temperature of 27° Celsius to resemble the reference temperature.

Figure 7:
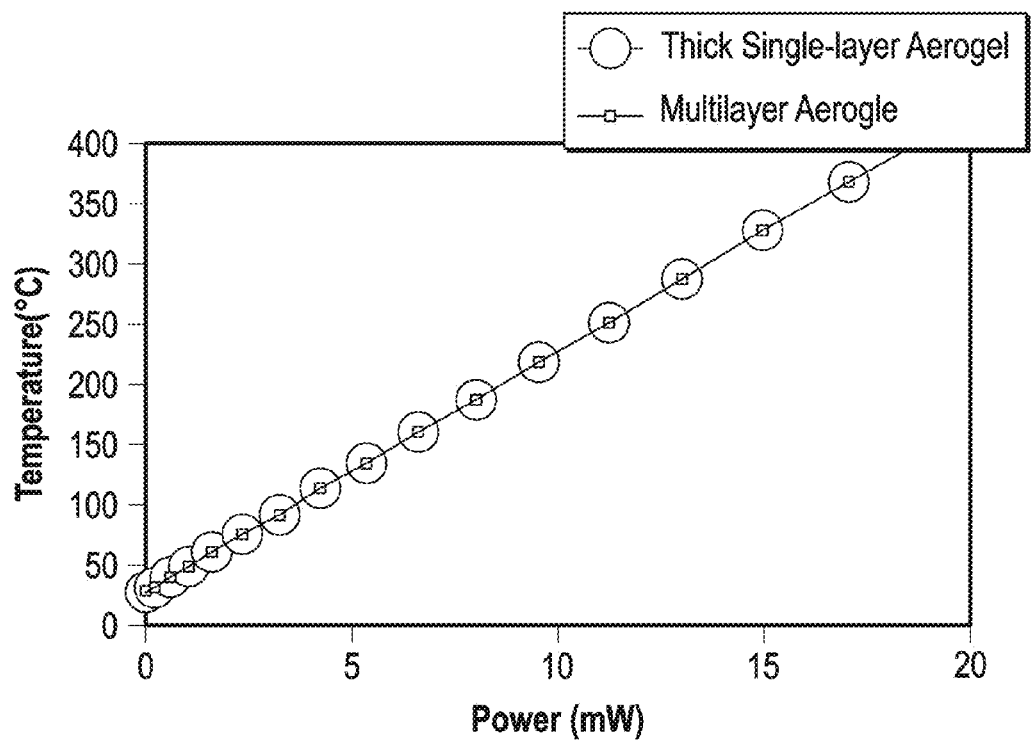
FIG. 7 is a graph comparing the temperature for single and multilayer aerogel in steady state mode.

A steady state analysis was performed for both single and multilayer aerogel to investigate the temperature gain versus consumed power. As demonstrated in FIG. 7, both structures achieved the same temperature at any given power. For instance, applying 15 mW power corresponds to the temperature of 320° Celsius. This promises multilayer processing with the advantage of having SiO$_2$ to cap the bottom aerogel layer avoiding the penetration of the above aerogel, and meanwhile no temperature loss due to utilizing the SiO$_2$ interlayer which itself is a very good heat conductor.

Figure 8:
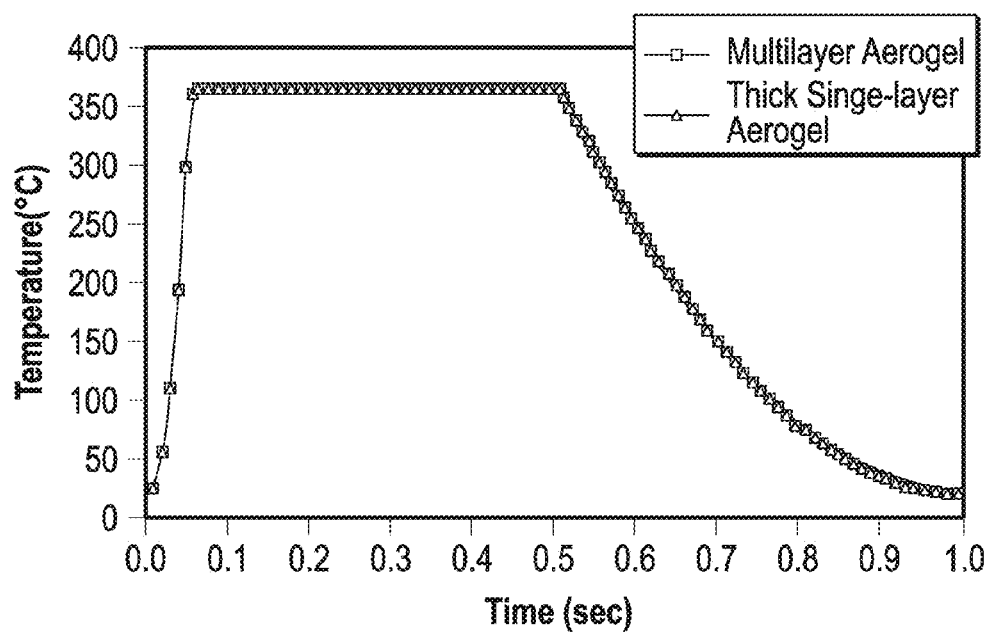
FIG. 8 is a graph depicting the transient analysis of single and multilayer aerogel.

Transient analysis was also conducted over a period of 1 second to investigate the required amount of time to reach the steady state temperature. As demonstrated in FIG. 8, it took 70 ms for both structures to reach steady temperature of 360° Celsius, which again verifies the capability of the interleaved multilayer aerogel to reach high temperature as fast as the thick single layer aerogel.

Technique for Producing Thin Film and Thick Film Layer Aerogels.

The process for producing thin and thick layer aerogels described herein comprises spraying the aerogel with ethanol, aging the aerogel, and then depositing the aerogel on the substrate multiple times to result in a thick layer of aerogel without further treatments. Specifically, supercritical drying and solvent exchange are not utilized in the process. By utilizing the process described herein, very tiny sol particles are created which are functional and able to link with ethanol to prepare small gel particles with the capability of being dried while spin/spray coating, which makes it possible for thin film or thick film processing. A thick film can be produced by depositing multiple coatings of thin film on the substrate.

Figure 15:
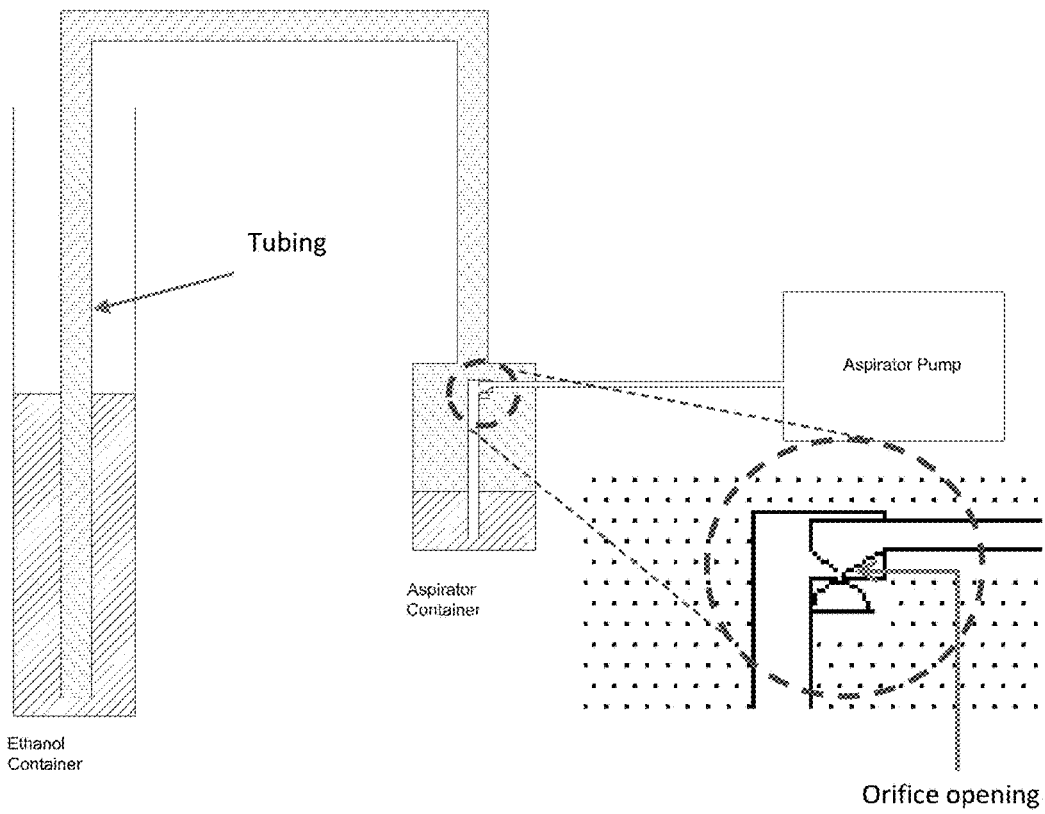
FIG. 15 depicts one embodiment of an apparatus for impregnating ethanol with functional colloidal alcogel particles.

With this embodiment, thin film aerogel was prepared using the following procedure. First, a solution was prepared implementing a 2-step sol-gel method by mixing tetraethyl orthosilicate (TEOS), which is a Si precursor, ethanol (a solvent), water, and HCl (the acid catalyst) with the molar ratio of $1:4:2:4.3 \times 10^{-4}$, respectively. It should be noted that the molar ratio for the embodiment described in Paragraph 41 is used for the supercritical method, described earlier. After an hour of stirring the solution, 0.64 ml of 0.066 M $NH_4OH$ solution (the base catalyst) was added and stirred for 5 minutes. After approximately 15% gelation time (the amount of time for the mixture to reach approximately 15% of its gelation time), the resulting mixture was sprayed into a 2 foot long column, which contained approximately 25 ml of ethanol, by an aspirator for 15 minutes. Any aspirator with a head opening size of 0.02 inches to 0.05 inches in diameter can be used. This results in the impregnation of ethanol with functional colloidal alcogel particles. After aging the impregnated ethanol at room temperature for approximately 24 hours, the solution was ultrasounded for 8 minutes. Then the impregnated ethanol solution was filtered using a 0.2 micrometer filter. Any filter can be used as long as the filter can filter particles greater than 0.2 micron. The filtered impregnated ethanol solution was then spin coated on a silicon wafer at approximately 1150 RPM for 40 seconds. In one embodiment, ambient spin coating is performed for each layer at between 300 to 400 RPM at the initial time of dispensing and approximately 1150 RPM for the final spinning speed, using an acceleration rate of approximately 110 RPM/sec. Any spin coater with the specified RPM and timing can be used. Additional layers are spin coated onto the wafer in succession to yield a smooth (less than 40 nm Ra roughness), thick, and highly porous multilayer without supercritical drying or solvent exchange. The example diagram in FIG. 15 shows the processing apparatus to make the impregnated ethanol liquid. However, any set up that accomplishes a similar impregnation of ethanol with functional colloidal alcogel particles can be used. In FIG. 15, the nebulizer (depicted as the small container which contains the mixture to be sprayed into the column) nebulization rate is approximately 0.2 ml/min; the nebulizer operating pressure is approximately 12-18 psig; the nebulizer orifice size is approximately 500 μm; the ethanol container's internal diameter is 1.2 cm; and the internal diameter of the tubing is 0.5 cm. Additionally, in FIG. 15, the low pressure is located right after the nebulizer orifice and the high pressure is before the orifice opening.

The processing of the sol-gel involves impregnation of ethanol by semi-gel functional colloidal particles of initial sol liquid. The process of impregnation is described in the preceding paragraph. The preparation of the initial sol liquid to be used for impregnation of the ethanol requires: 1) an acid and base catalyst with respect to solvents and precursors, and 2) starting impregnation before complete gelation. The sol-gel is formed after aging of the impregnated ethanol liquid.

In the coating process, the rate of evaporation of the solvent is controlled by the parameters affecting the evaporation rate. These parameters are the spin coating speed (in RPM), duration of spinning, and the partial pressure on top of the wafer. Using the disclosed sol-gel method for multi-spin coating of prepared solution yields an aerogel with high porosity and eliminates any further post-processing, such as conventional processes of solvent exchange, supercritical drying, heat treatment, etc. In this process, there is no need to use any additives to reduce the capillary stress in the deposited film during drying. One of the fundamental differences between the disclosed sol-gel and other reported aerogel film processes is that in the other reported aerogel film processes, first an alcogel is made and then the aerogel is obtained by further drying processes while the sol-gel described herein, the deposition and inherent drying occur at the same time. The alcogel is the gelled solution filled with the solvent and water.

Figure 16A:
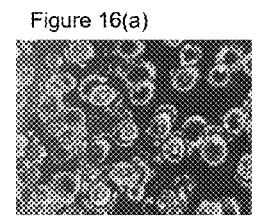
FIG. 16(a) depicts a film produced by spin coating, where a ratio of 0.385/7.005=0.055 µmole acid/µmole base were used.
Figure 16B:
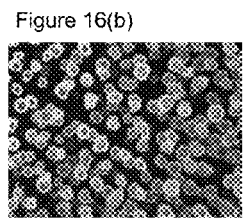
FIG. 16(b) depicts a thin film produced by spin coating, where a ratio of 1.925/56.04=0.034 µmole acid/µmole base was utilized.
Figure 16C:
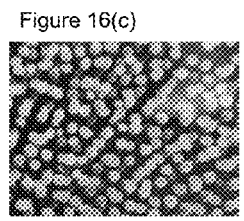
FIG. 16(c) shows a film produced by spin coating, where a ratio of 1.92/112.08=0.017 µmole acid/µmole base were utilized.
Figure 16D:
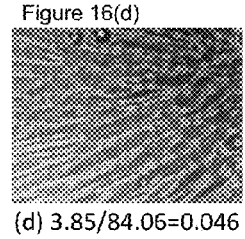
FIG. 16(d) depicts a film produced by spin coating, where a ratio of 3.85/84.06=0.046 µmole acid/µmole base was used.
Figure 16E:
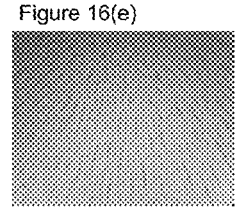
FIG. 16(e) shows a film produced by spin coating, where the ratio of 5.775/98.07=0.059 µmole acid/µmole base was utilized.
Figure 16F:
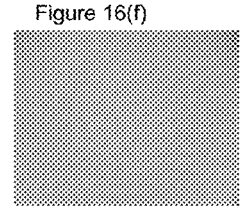
FIG. 16(f) depicts a film produced by spin coating, where the ratio of 7.7/42.03=0.183 µmole acid/µmole base was used.

FIGS. 16(a)-16(f) indicate the film produced by spin coating as the acid/base concentration is changed. The sol-gel disclosed herein needs a specific range acid and base catalyst concentration with respect to solvents and precursors to function properly. In FIGS. 16(a)-16(f), the molar ratio of acid and base in the initial mixed solution was increased as the texture of the film improved from (a) to (f). The film texture shown in FIG. 16(f) is the ideal ratio. FIG. 16(a) discloses a 0.385/7.005=0.055 μmole acid/μmole base. FIG. 16(b) depicts 1.925/56.04=0.034 μmole acid/μmole base. FIG. 16(c) shows 1.92/112.08=0.017 μmole acid/μmole base. FIG. 16(d) depicts 3.85/84.06=0.046 μmole acid/μmole base. FIG. 16(e) shows 5.775/98.07=0.059 μmole acid/μmole base. And FIG. 16(f) depicts 7.7/42.03=0.183 μmole acid/μmole base.

Figure 17:
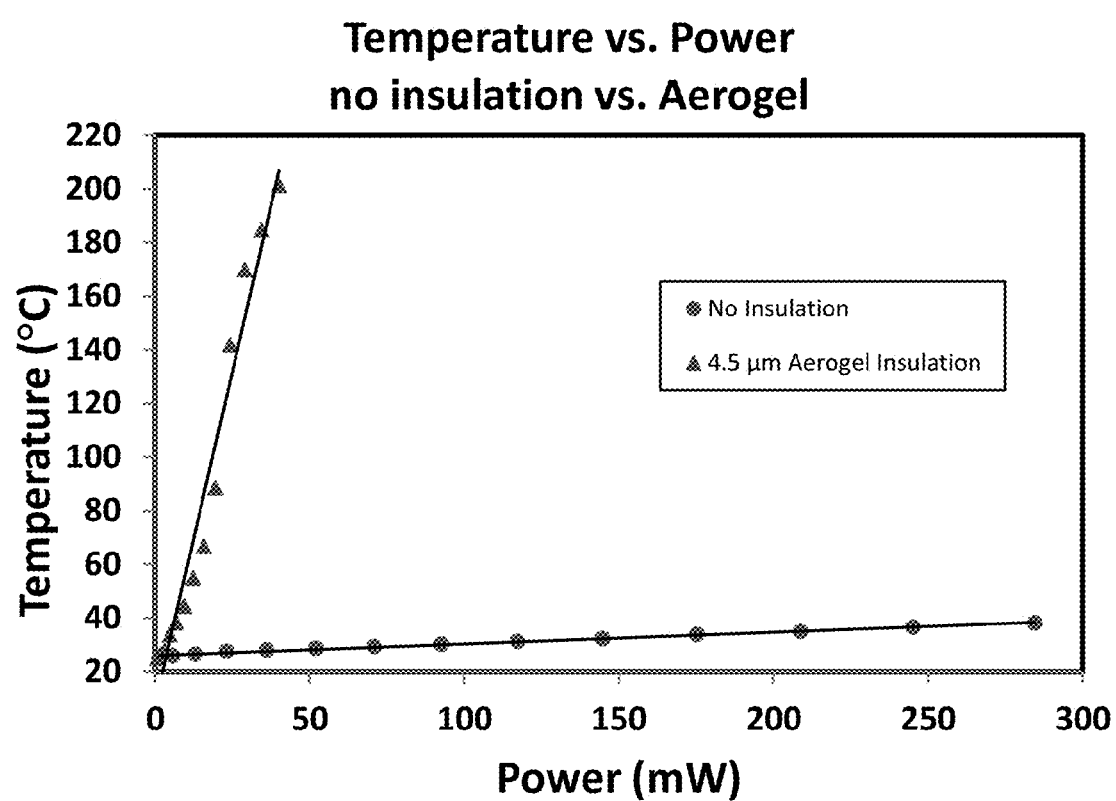
FIG. 17 is a graph showing the results to an increase in temperature versus the required power required to obtain the increase in temperature for NiCr heaters on uninsulated silicon wafers and NiCr heaters on aerogel-coated silicon wafers.
Figure 18:
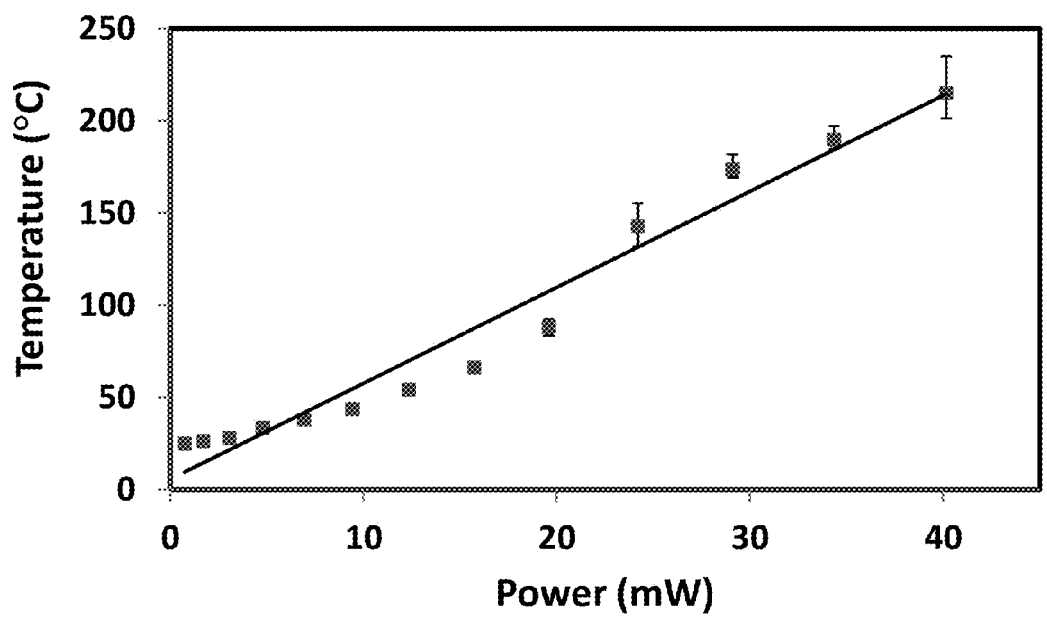
FIG. 18 is a graph depicting the temperature increase for NiCr heaters on silicon wafers comprising a 4.5 µm thick film aerogel.

The thermal oxide was grown on a 4-inch wafer in pure oxygen at 1000° C. for 24 hours to yield an approximately 300 nm thick $SiO_2$. Then the aerogel was spin-coated onto the wafer. After 75 layers (approximately 4.5 μm) of aerogel was spin-coated on the wafer, NiCr heater elements were fabricated on top of the aerogel by photolithography and selective etching. The temperature versus the applied power were measured and are shown on FIGS. 17 and 18. The NiCr heaters that were fabricated directly on top of the silicon wafer with no aerogel showed no or very little rise in temperature while the NiCr heaters fabricated on aerogel-coated wafers showed a significant rise in temperature with low applied power.

In one embodiment, the disclosed sol gel produced from the disclosed sol gel spin coated process has the same or better thermal conductivity than the thermal conductivity of the prior art bulk aerogel processed by the supercritical drying. In another embodiment, the spin coating in the disclosed sol-gel process was done in a time window of maturity of the liquefied solution prepared by the disclosed method before gelation i.e. after approximately 15% of the gelation time, and it was found that the resulting films had a thermal conductivity that was as least as good as the thermal conductivity resulting from the prior art supercritical dried bulk aerogel. Gelation is defined as the state of the solution when it doesn't flow anymore and becomes a complete gel. In this embodiment, the time window of maturity lasts approximately 2 hours. In another embodiment, the time window of maturity is approximately 60 minutes to approximately 180 minutes. In yet another embodiment, the window of maturity is approximately 100 minutes to approximately 140 minutes. In still another embodiment, the window of maturity is approximately 120 minutes. It has been found that during this approximately 120 minutes, the sol-gel can yield uniform, crack free, smooth thin or thick films, dried upon spin coating at atmospheric condition with ultra-low thermal conductivity as low as 0.001 W/m·K, which is one order of magnitude lower than the reported thermal conductivity of aerogels created using the prior art processes.

It is expected that the usage of the technique described herein in bulk aerogel processing requires supercritical drying, but it is also expected that a bulk aerogel will be obtained with the highest porosity reported, the lowest shrinkage, and the lowest internal stresses that are suitable for special applications in optical and medical fields. Furthermore, the technique described herein can be used to produce micron sized aerogel granules without milling or crushing.

For the purpose of understanding the ultra-dense and ultra-low power microhotplates using silica aerogel and the method of making the same, references are made in the text to exemplary embodiments of an ultra-dense and ultra-low power microhotplates using silica aerogel and the method of making the same, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the ultra-dense and ultra-low power microhotplates using silica aerogel and method of making the same may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

It should be understood that the word "aerogel" may also refer to aerogel that can be processed by any variant processing methods and characteristics.

Moreover, the terms "substantially" or "approximately" as used herein may be applied to modify any quantitative representation that could permissibly vary without resulting in a change to the basic function to which it is related.

The invention claimed is:

1. A method of making silica aerogel thin and thick films comprising:
   a. mixing TEOS, ethanol, water and HCl with the molar ratio of approximately $1:4:2:4.3\times10^{-4}$, respectively to form a first solution;
   b. stirring said first solution;
   c. adding 0.64 ml of 0.066 M $NH_4OH$ to create a second solution;
   d. stirring said second solution to create a sol-gel mixture;
   e. aspirating the sol-gel mixture with an aspirator at approximately 15% of gelation time;
   f. spraying said sol-gel mixture into a column of ethanol to create an impregnated ethanol mixture;
   g. aging said impregnated ethanol mixture at room temperature;
   h. ultrasounding said impregnated ethanol mixture;
   i. filtering said impregnated ethanol mixture resulting in a filtered impregnated ethanol mixture; and
   j. spin coating said filtered impregnated ethanol mixture onto a wafer creating an aerogel layer.

2. The method of claim 1, wherein said aerogel layer is less than approximately 40 nm Ra in roughness.

3. A method of preparing an aerogel comprising:
   a. mixing TEOS, ethanol, water and HCl to form a first solution;
   b. stirring said first solution;
   c. adding $NH_4OH$ to create a second solution;
   d. stirring said second solution to create a sol-gel mixture;
   e. aspirating the sol-gel mixture with an aspirator;
   f. spraying said sol-gel mixture into a column of ethanol to create an impregnated ethanol mixture;
   g. aging said impregnated ethanol mixture;
   h. ultrasounding said impregnated ethanol mixture;
   i. filtering said impregnated ethanol mixture resulting in a filtered impregnated ethanol mixture; and
   j. spin coating said filtered impregnated ethanol mixture onto a wafer creating an aerogel layer.

4. A method of preparing an aerogel comprising:
   a. spraying an alcogel composition into a column of ethanol to create a sol-gel;
   b. aging the sol-gel; and
   c. depositing the aged sol-gel to a substrate.

* * * * *